No. 750,212. Patented January 19, 1904.

UNITED STATES PATENT OFFICE.

CHARLES MOUREU, OF PARIS, FRANCE.

ETHER OF AMYLPROPIOLIC ACID.

SPECIFICATION forming part of Letters Patent No. 750,212, dated January 19, 1904.

Original application filed July 19, 1901, Serial No. 68,944. Divided and this application filed March 3, 1903. Serial No. 146,003.

(No specimens.)

*To all whom it may concern:*

Be it known that I, CHARLES MOUREU, a resident of Paris, France, have invented a new and useful Improvement in Ethers of Amyl and Hexyl Propiolic Acid and Derivatives and Processes of Making Same, which invention is fully set forth in the following specification.

In my application filed July 19, 1901, Serial No. 68,944, (whereof the present application is a division,) I have claimed that the amylpropiolic acid gives various derivates useful in perfumery, confectionery, soap manufacture, &c. I have particularly found that the ethers of this acid and those of the corresponding beta-ketonic acid possess such qualities.

The ethers of the amylpropiolic acid can be prepared, first, by the well-known etherification method—for example, by heating the alcohol with the acid or chlorid of the same or by using an etherification agent, such as sulfuric acid; second, by starting directly from the metal compounds of the hydrocarbon by the action of the chloroformic ether—ClCOOR.

Example: Ten parts of the amylpropiolic acid are mixed with ten parts of one-hundred-per-cent. alcohol and one part of concentrated sulfuric acid. The mixture is heated during thirty-six hours in a steam-bath. (In using larger quantities of sulfuric acid the time of the heating may be reduced.) After cooling, one dilutes with a solution of salt in water and extracts with a suitable solvent—*i. e.*, ether. The etheric solution is washed with an alkaline solution to recover the acid not transformed in its ether. The solvent is distilled off and the residue, the raw ether, rectified *in vacuo*. This ether when treated with sulfuric acid and the product of the reaction is poured into water gives the corresponding beta-ketonic ether by fixation of a molecule of water. The same beta-ketonic ether $(CH_3—CH_2—CH_2—CH_2—CH_2—CO—CH_2—CO_2—C_2H_5)$ can also be obtained by submitting the acid to the action of alkalies in aqueous solution and afterward etherifying the beta-ketonic acid obtained. For example, the operation may be as follows: The acid is heated with an excess of potash in alcoholic solution for some hours, the liquor is diluted with water, acidulated with a strong acid, (for example, sulfuric acid,) and is extracted with ether or other appropriate solvent. The etheric solution is washed with water and dried. The ether is evaporated in the cold, (for example, *in vacuo*,) and the residue thus obtained, in general solid, is etherified in the cold by saturating its alcoholic solution with hydrochloric-acid gas. The beta-ketonic ether produced is finally rectified by distillation *in vacuo*.

The ethers of the beta-ketonic acid possess the following characteristics: Methylic ether distils at 114° to 118° under sixteen to eighteen millimeters pressure; density at 0°, 0.998. Ethylic ether distils at 120° to 124° at sixteen to eighteen millimeters pressure; density at 0°, 0.975. The ethers of the acid

$CH_3—CH_2—CH_2—CH_2—CH_2—C≡C—CO_2H$ possess the following characteristics: Methylic ether distils at 105° to 109° under twenty to twenty-one millimeters pressure; density at 0°, 0.952. Ethylic ether distils at 114° to 117° under seventeen to eighteen millimeters pressure; density at 0°, 0.930. Isopropylic ether distils at 125° to 128° under twenty-two to twenty-three millimeters pressure; density at 0°, 0.918. Isobutylic ether distils at 137° to 140° under twenty-three to twenty-four millimeters pressure; density at 0°, 0.916. Isoamylic ether distils at 147° to 150° under twenty to twenty-one millimeters pressure; density at 0°, 0.911. Allylic ether distils at 123° to 129° under seventeen to nineteen millimeters pressure; density at 0°, 0.946. Benzylic ether distils at 184° to 190° under sixteen to eighteen millimeters pressure; density at 0°, 1.023. All of these ethers are oily, colorless, or practically colorless transparent liquids, which are not crystallizable by ordinary methods at temperatures above 0° centigrade, having an agreeable aroma, and are suitable for employment more particularly in the manufacture of essences, perfumery, confectionery, soap, and similar products.

Having now fully described my said invention, what I claim is—

1. An ether of amylpropiolic acid of the type $$R.CO_2C{\equiv}C.CH_2.CH_2.CH_2.CH_2CH_3$$

and $$R_1.CO_2C{\equiv}C.CH_2.CH_2.CH_2.CH_2.CH_3,$$

R being an aliphatic radical as methyl, ethyl, &c., or allyl, and $R_1$ being an aromatic radical as benzyl, &c., said ethers being oily colorless or practically colorless transparent liquids of agreeable aroma, non-crystallizable by ordinary methods at temperatures above 0° centigrade, and having the properties and characteristics herein specified.

2. A beta-ketonic ether of amylpropiolic acid of the type $$R.CO_2.CH_2.CO.CH_2.CH_2.CH_2.CH_2.CH_3,$$

R being an alcoholic radical as methyl, ethyl, &c., said ethers being oily colorless or practically colorless transparent liquids of agreeable aroma, non-crystallizable by ordinary methods at temperatures above 0° centigrade, and having the properties and characteristics herein specified.

In testimony whereof I have signed this specification in the presence of two subscribing witnesses.

CHARLES MOUREU.

Witnesses:
JULES ARMENGAUD, Jeune,
AUGUSTUS E. INGRAM.